United States Patent [19]

Thevenon

[11] Patent Number: 4,495,379

[45] Date of Patent: Jan. 22, 1985

[54] SPLICE FOR ELECTRIC CABLE ARMOR

[75] Inventor: Henri Thevenon, Lyons, France

[73] Assignee: Les Cables de Lyon, Clichy, France

[21] Appl. No.: 558,250

[22] Filed: Dec. 5, 1983

[30] Foreign Application Priority Data

Dec. 3, 1982 [FR] France .................................. 82 20254

[51] Int. Cl.³ ...................... H02G 15/08; F16G 11/12
[52] U.S. Cl. ................................. 174/88 R; 174/84 S; 174/88 S; 403/44
[58] Field of Search .................. 174/88 R, 88 S, 84 S; 403/43, 44, 45, 46

[56] References Cited

U.S. PATENT DOCUMENTS

| | | | |
|---|---|---|---|
| 1,226,830 | 5/1917 | Walker | 403/44 |
| 1,979,304 | 11/1934 | Anderson | 403/43 X |
| 2,470,423 | 5/1949 | Alford | 174/84 S |
| 3,134,843 | 5/1964 | Monelli | 174/88 R |
| 3,342,928 | 9/1967 | Forney | 174/88 R |
| 3,592,958 | 7/1971 | Munn | 174/88 R |
| 4,111,568 | 9/1978 | Wing | 403/44 X |

FOREIGN PATENT DOCUMENTS 377339  7/1932  United Kingdom ............. 174/84 S

*Primary Examiner*—A. T. Grimley
*Assistant Examiner*—Morris H. Nimmo
*Attorney, Agent, or Firm*—Sughrue, Mion, Zinn, Macpeak, and Seas

[57] ABSTRACT

A splice for splicing together the steel armor wires (3, 3') of two armored electric cable ends (1, 1') after the remainder of the cable has been spliced, and in which the end of each armor wire of one of the cable ends is joined to the end of a corresponding armor wire of the other cable end by means of a sleeve (4). Each sleeve comprises a right-and-left screw link into which correspondingly right hand and left hand threaded armor wires ends are screwed. The cable may be a submarine cable for transporting electrical power.

4 Claims, 4 Drawing Figures

U.S. Patent  Jan. 22, 1985  4,495,379
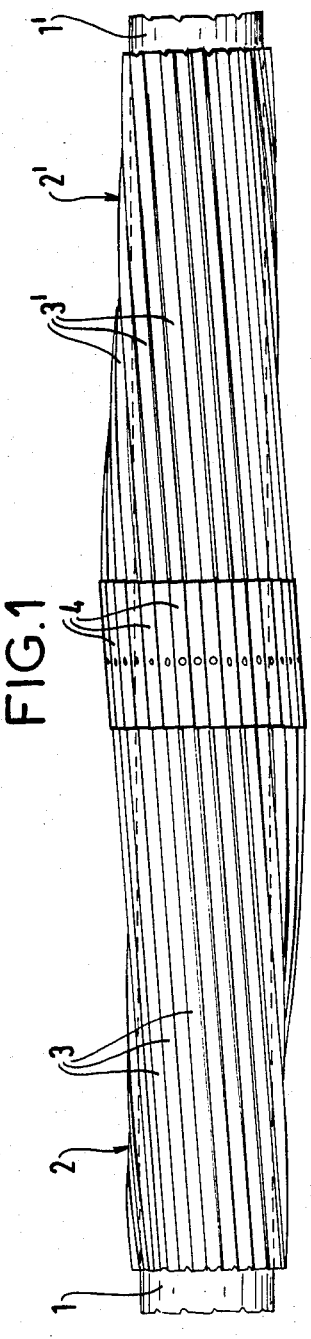
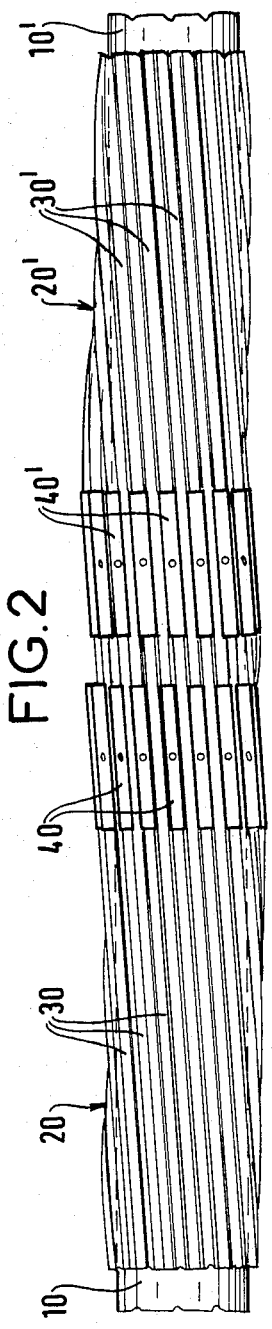
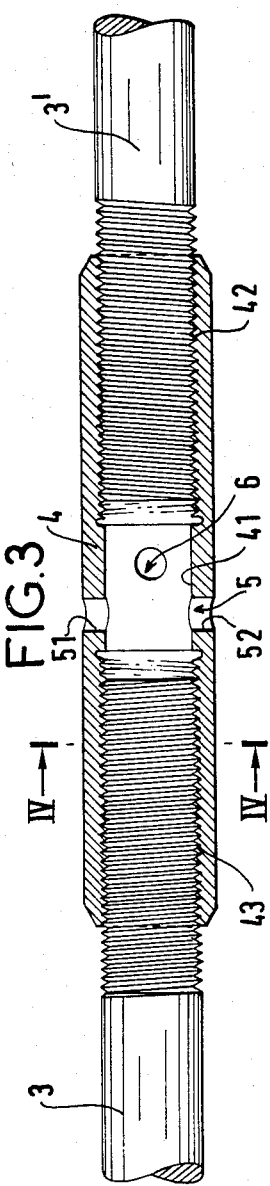
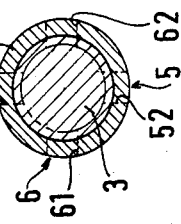

SPLICE FOR ELECTRIC CABLE ARMOR

The present invention relates to a splicing electric cable armor, after the remainder of said cable has been spliced. Splicing may be required to join together the ends of two lengths of electric cable during cable laying or else during repair to a damaged cable. The electric cable being spliced may be a power transmission line.

BACKGROUND OF THE INVENTION

An electric cable, particularly an underwater cable, is surrounded by a reinforcing armoring of steel wires for protection in the event of the cable being accidentally caught up in various objects such as anchors or fishing trawls.

When a splice is made in an armored cable, and once the cable per se has been spliced, it is necessary to interconnect the armoring wound round each of the lengths of cable.

Armor wires have previously generally been spliced by overlapping the armour wires over a given length, with each armor wire of one portion of the cable being laid between two armor wires of the other portion, and then tightly binding the cable where the armor wires overlap. The length of overlap should be about five to seven times the pitch length of the armor wires. For a large cable whose armor wires may be laid with a pitch length of as much as 3 meters, such an overlapping technique requires a prohibitive length of cable for splicing to be performed on board a cable ship.

Such overlapping and binding does not avoid the danger of slip in the event of untimely traction being applied to the cable being spliced. Further, if the cable is a single pole AC conductor, the overlapping splice does not ensure good electrical continuity between the armoring on either side of the splice.

Preferred embodiments of the present invention avoid the above drawbacks, providing a strong splice that extends over a short length only of the armoring, without significant danger of slipping, and providing good electrical continuity. A short splice of this nature may also be safely wound on a cable drum without risking damage to the cable.

SUMMARY OF THE INVENTION

The present invention provides a splice for splicing together the steel armor wires of two armored electric cable ends after the remainder of the cable has been spliced, and in which the end of each armor wire of one of the cable ends is joined to the end of a corresponding armor wire of the other cable end by means of a sleeve, the improvement wherein each sleeve has one end portion which is tapped with a left hand thread and an opposite end portion which is tapped with a right hand thread, and wherein one of the ends of armor wire joined by each sleeve has a corresponding left hand thread and the other of the armor wire ends joined by said sleeve has a corresponding right hand thread.

Preferably each sleeve has two pairs of diametrically opposed openings for receiving a tommy bar along two different diameters at right angles to each other. The tommy bar is used during splicing for turning the sleeve to screw it to the armor wires which it joins together. The sleeves enable the lay of the armor wires to be undisturbed by the splice.

In a first arrangement, all the sleeves are located at the same axial position along the cable, while in a second arrangement, the sleeves are staggered with alternate sleeves occupying one of two axially separate positions.

BRIEF DESCRIPTION OF THE DRAWING

Two possible arrangements of a splice in accordance with the invention are described by way of example with reference to the accompanying drawing, in which:

FIG. 1 is a side view of a splice with all its sleeves located at the same axial position;

FIG. 2 is a side view of a splice with sleeves located in a staggered arrangement at two different axial positions;

FIG. 3 is a partially cut-away side view through a single sleeve; and

FIG. 4 is a cross section on a line IV—IV in FIG. 3.

MORE DETAILED DESCRIPTION

In FIG. 1 which shows a first arrangement of a splice in accordance with the present invention, joining first and second ends 1, 1' of cable having armor 2, 2' in the form of helically wound steel wires 3, 3'.

Each armor wire 3 is connected to an armor wire 3' by a sleeve 4. All the sleeves 4 are located at the same axial position along the cable and lie around its circumference. The sleeves are at an angle to the axis of the cable to so that the lay of the armor wires is undisturbed by the splice. This ensures that traction forces are constant at the splice, and avoids extra armor wire length being required because of the cable being thicker at the splice. In practice, the diameter of each sleeve is 1.2 to 1.3 times the diameter of each armor wire. This may mean that the cable diameter is increased by 30% in the vicinity of the splice.

FIG. 2 shows a second arrangement of a splice in accordance with the invention. Each end of cable to be spliced 10, 10' has armor 20, 20' made up of steel wires 30, 30'. The sleeves are staggered, giving one set of sleeves 40 and a second set of sleeves 40'.

FIG. 3 shows a sleeve 4 joining together two cables 3 and 3'. The sleeve is in longitudinal section. A suitable length of the end of each wire 3, 3' is threaded. The wire 3 has a right hand thread and the wire 3' has a left hand thread. The sleeve 4 has a longitudinal bore 41 which is tapped from each end with respective right hand and left hand threads 43 and 42 for receiving the wires 3 and 3'.

In the middle, the sleeve 4 has two pairs of diametrically opposite openings 51, 52 and 61, 62 which define two mutually perpendicular diameters. These openings serve to receive a tommy bar or similar tool for tightening the sleeve onto the ends of the wires 3 and 3'. Other means for turning the sleeve could be divised, for example it could have a portion of hexagonal section capable of being turned by a spanner.

The sleeve is preferably made of a metal which is mechanically stronger than the metal of the armor wires, eg. having a tensile strength which 50% to 100% greater. This enables the sleeves to be relatively thin walled, thus reducing the outside diameter to a minimum. Advantageously, the metal is of substantially the same electrical conductivity as the metal of the armor wires.

Without going beyond the scope of the invention, the sleeves could be distributed in some other axial arrangement, eg. occupying three or four axially distinct bands.

I claim:

1. A cable splice splicing together the ends of two underwater cables, said cables having a plurality of armor wires wrapped helically thereabout at equal pitch, corresponding armor wires of respective cable ends having wire ends in axial alignment, the improvement wherein the ends of respective axially aligned armor wires having respectively right hand and left hand threads, and a plurality of sleeves, each sleeve having one end portion tapped with a left hand thread and an opposite end portion tapped with a right hand thread, and being threaded to the threaded ends of given axially aligned armor wires, whereby said sleeves enable the lay of the helically wrapped armor wires to be undisturbed by the splice effected thereby.

2. A splice according to claim 1, wherein each sleeve has two pairs of diametrically opposite openings defining first and second mutually perpendicular diameters for receiving a tommy bar or like tool.

3. A splice according to claim 1, wherein all of said sleeves are located at the same axial position along the splice.

4. A splice according to claim 1, wherein said sleeves are located in a longitudinally staggered arrangement occupying two different axial positions along said splice.

* * * * *